US006393711B1

(12) United States Patent
Freund

(10) Patent No.: US 6,393,711 B1
(45) Date of Patent: May 28, 2002

(54) SIDING GAUGING TOOL

(76) Inventor: Todd Freund, 250 18th Ave. South, Wisconsin Rapids, WI (US) 54495

( * ) Notice: Subject to any disclaimer, the term of this patent is extended or adjusted under 35 U.S.C. 154(b) by 22 days.

(21) Appl. No.: 09/739,415

(22) Filed: Dec. 18, 2000

(51) Int. Cl.[7] ................................................ B23Q 17/22

(52) U.S. Cl. ........................................... 33/626; 33/646

(58) Field of Search .......................... 33/646, 647, 648, 33/649, 613, 626, 411; 227/140, 154, 142, 123

(56) References Cited

U.S. PATENT DOCUMENTS

| | | | | | |
|---|---|---|---|---|---|
| 1,031,854 | A | | 7/1912 | Keyes | |
| 3,463,480 | A | * | 8/1969 | Edstrom | 269/309 |
| 4,187,589 | A | * | 2/1980 | Jobe, II | 227/66 |
| 4,654,975 | A | | 4/1987 | Lopez | 33/626 |
| 4,731,917 | A | | 3/1988 | Krowl | 29/432 |
| 4,821,937 | A | * | 4/1989 | Rafferty | 227/142 |
| 5,094,380 | A | * | 3/1992 | Nasiatka | 227/130 |
| D334,892 | S | | 4/1993 | Jenkins | D10/64 |
| 5,400,519 | A | | 3/1995 | Meyer | 33/646 |
| 5,405,071 | A | * | 4/1995 | Baugus | 227/140 |
| 5,465,499 | A | | 11/1995 | LaPlante | 33/647 |
| 5,564,614 | A | * | 10/1996 | Yang | 227/142 |
| 5,743,455 | A | * | 4/1998 | Holliday | 227/119 |
| 5,785,227 | A | * | 7/1998 | Akiba | 227/142 |

* cited by examiner

*Primary Examiner*—Diego Gutierrez
*Assistant Examiner*—Ryan T. Hayleck
(74) *Attorney, Agent, or Firm*—Kinney & Lange, P.A.

(57) ABSTRACT

The present invention includes a gauging tool for attachment to a fastener gun which dispenses fasteners. The gauging tool includes a positioning shoulder that is placed against the shoulder of siding that is to be secured to the wall of a building. The siding includes an attaching lip through which fasteners are driven for fastening the siding to the wall. The gauging tool of the present invention automatically positions the fastener a selected distance from the shoulder of the siding and automatically drives the fastener a selected depth into the wall.

10 Claims, 3 Drawing Sheets

SIDING GAUGING TOOL

BACKGROUND OF THE INVENTION

This invention relates to tools and instruments in the field of construction and is particularly directed to the fastening of siding or other building material with use of a fastener gun such as a nail or staple gun.

Vinyl siding is commonly applied as a building exterior surface over subsurfaces of many types of material, including low-density wood fiber insulation board, very low-density plastic foam insulation board or relatively high-density wood such as plywood. The vinyl siding is normally attached to the subsurface by nails or staples. Typically, the use of nails or staples involves the use of a pneumatic actuated nail or staple gun. The operator grasps the nail gun while "shooting" the nail into the siding by pulling a trigger on the nail gun and simultaneously tapping the dispensing end of the nail gun onto the siding surface. It is the simultaneous pulling of the trigger and tapping the gun on the surface that discharges the nail or staple into the siding, securing the siding to the building. The tapping of the dispensing end of the fastener gun is necessary in order to disengage the safety release, which allows the fastener to be discharged.

Vinyl siding expands and contracts with changes in temperature. Thus, it is known in the art that while fastening the siding, the staple or nail crown must be close to, but not entirely against, the siding so that the siding is always free to move in a lengthwise direction in response to changes in temperature.

U.S. Pat. No. 5,400,519 to Meyer discloses a siding application and gauging tool that allows one person to apply siding to a building. A support holds one end of a long piece of siding allowing the operator to secure the other end of the siding. U.S. Pat. No. 4,654,975 to Lopez discloses a siding gauge for attachment to a nail gun and adjustable bars to permit the nailing of different sizes of sidings.

BRIEF SUMMARY OF THE INVENTION

The present invention includes a gauging tool for attachment to a fastener gun which dispenses fasteners. The gauging tool includes a positioning shoulder that is placed against the shoulder of a section of siding that is to be secured to the wall of a building. The siding includes an attaching lip through which fasteners are driven for fastening the siding to the wall. The gauging tool of the present invention automatically positions the fastener a selected distance from the shoulder of the siding and automatically drives the fastener a selected depth into the wall.

DETAILED DESCRIPTION

Figure 1:
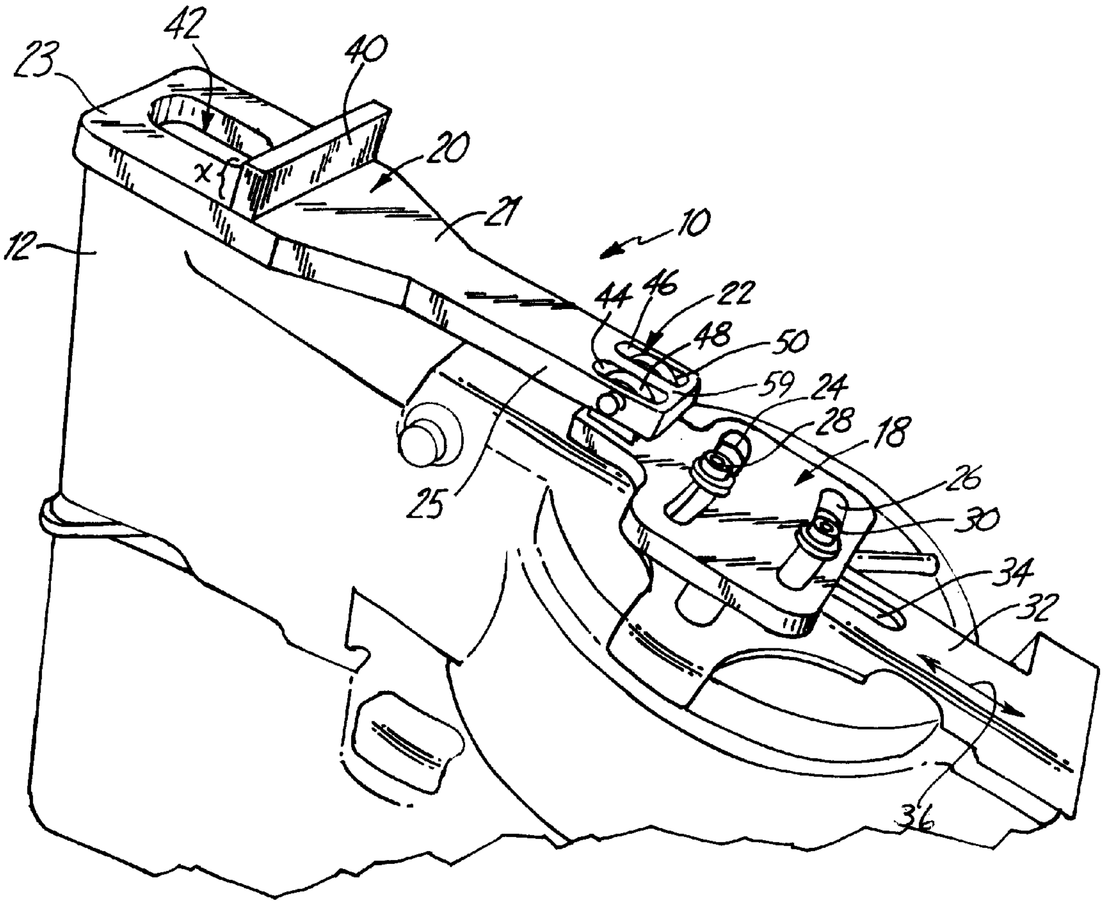
FIG. 1 is a perspective view of the present invention attached to a nail gun.
Figure 2:
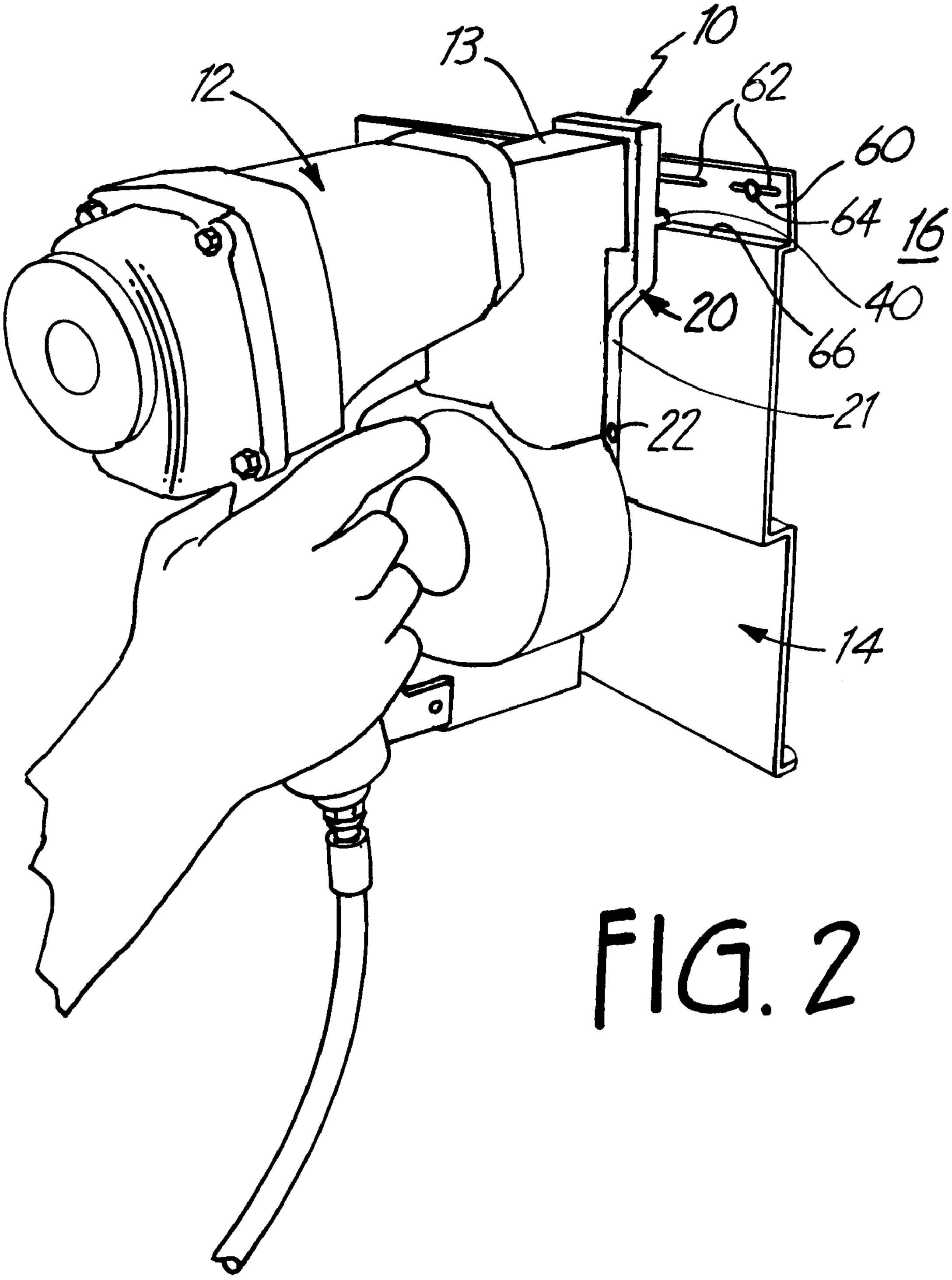
FIG. 2 is a perspective view of the present invention attached to a nail gun.

The siding gauge tool of the present invention is generally illustrated at 10 in FIG. 1, attached to a pneumatically actuated nail or staple gun 12. The siding gauge tool 10 in cooperation with the nail gun 12 is used to secure longitudinal lengths of vinyl siding 14 to a building wall 16 as illustrated in FIG. 2. Although a pneumatically actuated nail or staple gun is specifically disclosed, the siding gauge tool can also be used for attachment to other forms of fastener dispensing tools for a variety of construction purposes to attach construction-type material.

Figure 3:
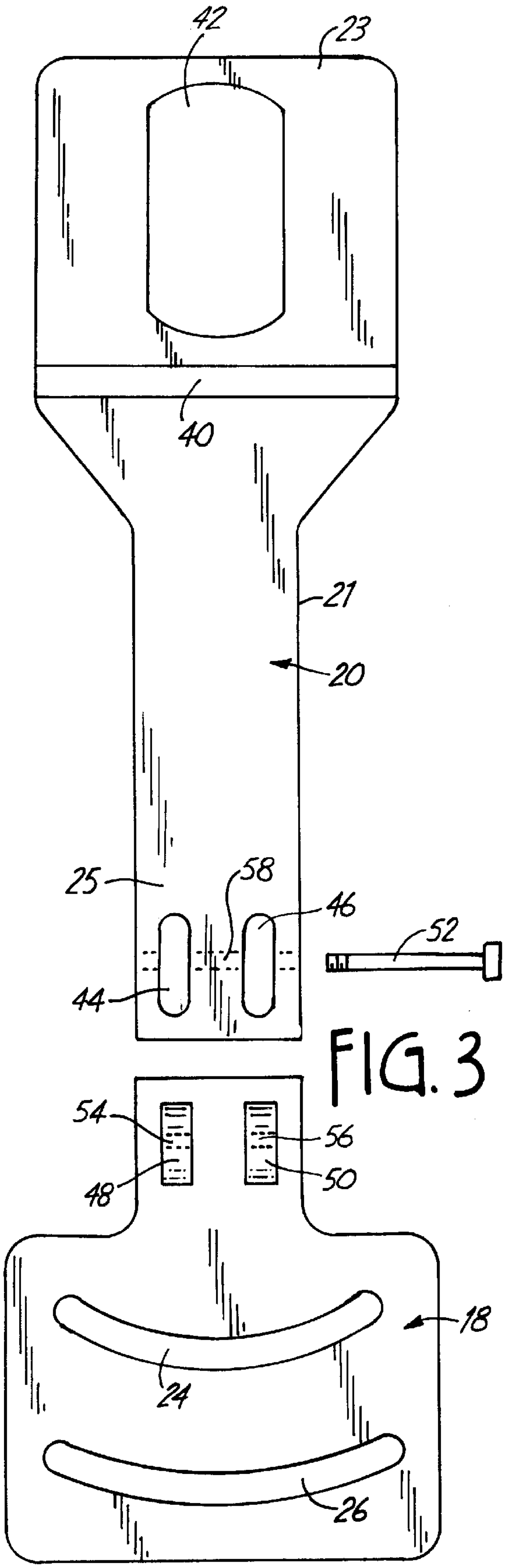
FIG. 3 is a front view of the present invention.
Figure 4:
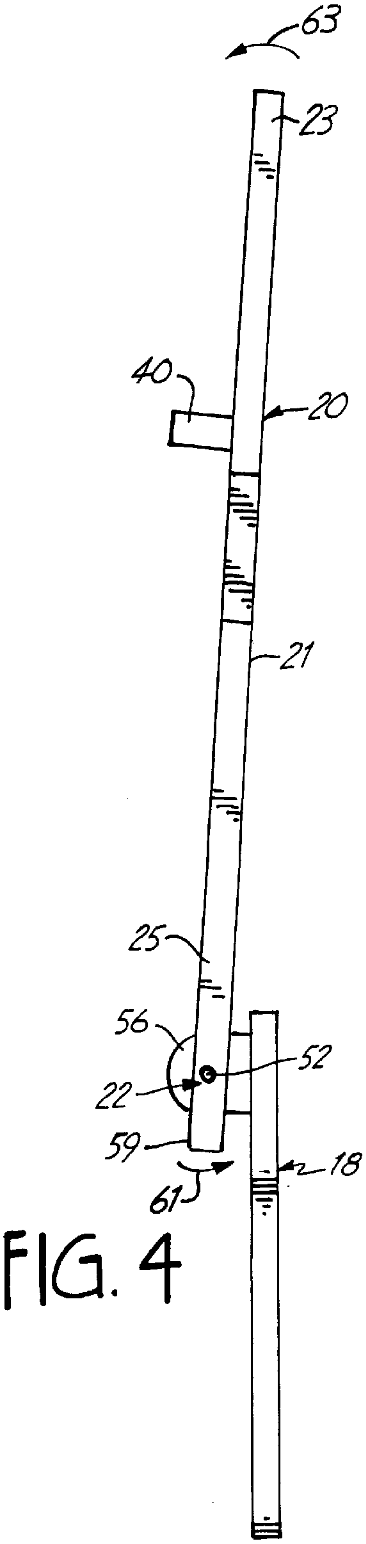
FIG. 4 is a side view of the present invention.

As best illustrated in FIGS. 3 and 4, the siding gauge tool 10 includes an attachment member 18 and gauge member 20. The attachment member 18 and the gauge member 20 are pivotally connected at pivot connection 22 as best illustrated in FIG. 4.

The attaching member 18 includes first and second slots 24 and 26 through which extend retaining cap screws 28 and 30, respectively. The retaining screws 28 and 30 thereby engage a base member 32 of the nail gun 12. The base member 32 includes a slot 34 through which the screws 24 and 26 also extend and permit movement of the attaching member 18 in a general direction illustrated by arrows 36 which is also along the longitudinal axis of the nail gun 12. The slots 24 and 26 are of an arcuate configuration permitting movement of the base member 18 in a direction generally transverse to the longitudinal axis of the nail gun 12 and also angularly with respect to the longitudinal axis of the nail gun due to the arcuate configuration of slots 24 and 26.

The gauge member 20 includes a main body 21, siding engaging positioning shoulder 40 extending outwardly from the member 21 and a nail throughput slotted aperture 42 at a distal end 23 of the main body 21. The main body 21 is generally longitudinal in configuration having a narrower proximal end 25 and the distal end 23 being wider than end 25. As best illustrated in FIG. 2, the configuration of the main body 21 generally follows the configuration of the nail gun surface to which the main body 21 is adjacent. The configuration of the main body 21 is not particularly important to the present invention.

At a proximal end 25, the gauge member 20 includes a pair of pivot slots 44 and 46 disposed adjacent to each other for receiving a pair of adjacently disposed pivot tabs 48 and 50 that are secured to and extend outwardly from the connecting member 18. As best illustrated in FIG. 3, each pivot tab 48 and 50 include apertures 54 and 56, respectively, that lie along the same axis. The gauge member 20 also includes a bore 58 that extends through the main body 21 and communicating with the slots 46 and 48 such that when the tabs 54 and 56 are received by the slots 46 and 48, the apertures 54 and 56 are aligned with the bore 58. A pivot pin 52 extends through the apertures 54 and 56 and the bore 58 providing the pivotal connection between the gauge member 20 and the connecting member 18, as best illustrated in FIGS. 1 and 4. The slots 44 and 46 are disposed to provide a proximal end section 59 as best illustrated in FIGS. 1 and 5. It will be appreciated that the end section 59 when the gauging member 20 pivots in a direction indicated by arrow 61 engages the connecting member 18 and functions as a stop limiting the pivotal movement of the distal end 23 in a direction indicated by arrow 63 in FIG. 4. Although a specific pivot connection is described and illustrated in the drawings, other methods of attaching the gauge member 20 to the connecting member 18 is within the scope of the present invention.

The siding 14 is of a type that includes an upper lip 60 and an upper shoulder 66 adjacent the lip 60 as best illustrated in FIG. 2. The upper lip 60 of the siding 14 is hidden once a lower end of another section of siding is positioned over the upper lip 60. The lip 60 includes nail slots 62 for receiving nails 64 or other fasteners that are shot from the nail gun 12.

The positioning shoulder 40 of the device 10 is positioned on the upper shoulder 66 of the siding 14. The positioning shoulder 40 is disposed on the gauge member 20 a selected distance from the nail shooting aperture (not shown) of the nail gun such that the nail-to-be-shot is automatically positioned to be shot through the slot 62 of the siding 14. The slotted aperture 42 provides room to adjust the position of the nail-to-be-shot with respect to the positioning shoulder 40 while the cap screws 24 and 26 permit positioning of the entire device 10 along the longitudinal axis of the nail gun 12 to effect the proper distance between the nail-to-be-shot (not shown) and the positioning shoulder 40 so that the nail engages the slotted aperture 42 of the lip 60. Positional adjustments may also be made transversely and angularly to accommodate different types of nail guns and position the device of the present invention so that the nail engages the slotted aperture 42.

The thickness of the distal end 23 and the height x of the positioning shoulder 40 are selected such that the nail 64 is driven into the building wall 16 a selected depth. In some nail guns the pneumatic pressure may also be adjusted. It is desirable not to directly engage the lip 60 of the siding directly with the head of nail 64. Vinyl siding has a tendency to expand and contract with temperature changes. The present invention automatically sets the amount of spacing between the head of the nail 64 and the surface of the lip 60 of the siding 14 to ensure that the head of the nail is not “pinching” directly against the surface of the lip 60.

In use, the device 20 once secured to the nail gun 12, and the appropriate distance set between the positioning shoulder 40 and the nail-to-be-shot, and the nail gun is adjusted for the appropriate pneumatic force to drive the nail to the selected depth into the building wall 16, the positioning shoulder 40 is placed on the shoulder 66 of the siding 14. The nail gun is pivoted forwardly about the pivot connection 22 to permit the forward end 13 of the nail gun to “tap” against the siding. This forward pivoting of the nail gun 12 to “tap” against the siding 14 is necessary to disengage the safety mechanism of the nail gun so that the operator may pull the trigger to dispense the nail-to-be-shot from the nail gun and into the slot 62 and building wall 16.

Although the present invention has been described with reference to preferred embodiments, workers skilled in the art will recognize that changes may be made in form and detail without departing from the spirit and scope of the invention.

What is claimed is:

1. A gauging tool for attachment to a fastener gun which includes fasteners-to-be-shot for dispensing, the gauging tool for gauging the placement of the fastener gun in relation to siding for attachment to a wall, the siding having a siding shoulder, the gauging tool comprising:

a connecting member for attachment to the fastener gun; and a siding engaging member rotatably attached to the connecting member, the siding engaging member having a positioning shoulder to engage the siding shoulder for positioning the fasteners-to-be-shot a pre-selected distance from the shoulder.

2. The tool of claim 1 wherein the siding engaging member includes a slotted aperture at a distal end through which the fasteners-to-be-shot are shot through.

3. The tool of claim 1 wherein the fastener gun has a longitudinal axis and the connecting member includes a first connecting slot disposed generally transversely to the longitudinal axis of the fastener gun, and the connecting slot permitting transverse adjustment of the connecting member to the fastener gun.

4. The tool of claim 3 wherein the first connecting slot is arcuate.

5. The tool of claim 3 and further including a second connecting slot.

6. The tool of claim 1 wherein the connecting member is slidably connected to the fastener gun.

7. The tool of claim 6 wherein the connecting member is securable in a fixed position from a slidable state.

8. The tool of claim 6 wherein the connecting member is slidably connected to the fastener gun such that the connecting member is slidable along a longitudinal axis of the gun and in a direction transverse to the longitudinal axis.

9. The tool of claim 6 wherein the connecting member is slidable in a angular direction from a longitudinal axis of the fastener gun.

10. The tool of claim 1 and further including a pivot pin engaging the connecting member and the siding engaging member in pivotal connection.

* * * * *